United States Patent [19]

Bolster et al.

[11] Patent Number: 4,835,074

[45] Date of Patent: May 30, 1989

[54] MODIFIED CARBONS AND ELECTROCHEMICAL CELLS CONTAINING THE SAME

[75] Inventors: Mary-Elizabeth Bolster, Clarence; Duane J. Mazur, Amherst; Norman L. Weinberg, East Amherst, all of N.Y.

[73] Assignee: The Electrosynthesis Company, Inc., East Amherst, N.Y.

[21] Appl. No.: 101,068

[22] Filed: Sep. 25, 1987

[51] Int. Cl.$^4$ ............... H01M 4/02; H01M 4/86; H01B 1/04; B01J 21/18
[52] U.S. Cl. .................... 429/43; 429/209; 429/232; 252/510; 502/162; 502/180; 502/200
[58] Field of Search .............. 429/43, 209, 232; 252/509, 510; 502/162, 180, 200

[56] References Cited

U.S. PATENT DOCUMENTS

| | | | |
|---|---|---|---|
| 3,993,501 | 11/1976 | Kalnoki-Kis | 429/48 |
| 4,020,240 | 4/1977 | Schlaikjer | 429/50 |
| 4,093,784 | 6/1978 | Driscoll | 429/101 |
| 4,167,608 | 9/1979 | Giattino | 429/196 |
| 4,170,693 | 10/1979 | Catanzarite | 429/48 |
| 4,252,875 | 2/1981 | Venkatasetty | 429/196 |
| 4,526,881 | 7/1985 | Binder et al. | 502/180 X |
| 4,737,173 | 4/1988 | Kudirka | 55/470 X |

OTHER PUBLICATIONS

Wade et al., Proc. of the Workshop on the Electrochemistry of Carbons, vol. 84-85, 479-491, 1983.
Walker et al., J. Electrochem. Soc., vol. 132, 1536-1539, 1985.
Matsue et al., J. Electrochem. Soc., vol. 128(7), 1473-1478, 1981.
K. A. Klinedinst, J. Electrochem. Soc., vol. 132(9), 2044-2050, 1985.
Murray et al., Analytical Chemistry, vol. 59 (5), 379A-380A, Mar. 1987.
R. W. Murray, Electroanalytical Chemistry, vol. 13, A. J. Bard Editor, Marcel Dekker, Inc., 191-200, 263-297, 351-368, 1984.
Watkins et al., J. Am. Chem. Soc., vol. 97, 3549-3550, 1975.
Firth et al., J. Am. Chem. Soc., 8271-8272, 1976.

Primary Examiner—Stephen J. Kalafut
Attorney, Agent, or Firm—Howard M. Ellis

[57] ABSTRACT

Elemental carbon with or without added oxygen functionality is chemically modified with covalently bonded nitrogen-containing groups to provide novel, high performance elemental carbons for electrochemical cells, including electrodes for energy consuming cells, and especially energy producing cells like lithium-oxyhalide high energy-density batteries, alkaline batteries, and the like.

36 Claims, No Drawings

1

MODIFIED CARBONS AND ELECTROCHEMICAL CELLS CONTAINING THE SAME

This invention was made with Government support under Contract No. F33615-86-C-2656, awarded by the Department of Defense. The Government has certain rights in this invention.

BACKGROUND OF THE INVENTION

The present invention relates generally to improved carbons for electrochemical cells, and more specifically, to modified carbons and carbon electrodes, as well as energy producing electrochemical cells, and energy consuming cells for electrochemical synthesis equipped with such carbon electrodes.

Modern technology has placed increased emphasis on producing electrochemical power sources having improved reliability, low weight, small size, high power and longer life. Power sources meeting these criteria readily find applications in portable electronic devices, aircraft, entertainment devices, emergency lighting, wrist watches, hearing aids and calculators, to name but a few.

Various high voltage, high energy-density electrochemical cells have been the subject of recent investigations. Much of the work in this field has involved batteries comprising highly reactive metals, such as lithium. Lithium batteries comprising "soluble cathodes" include the oxyhalide systems lithium/thionyl chloride and lithium/sulfuryl chloride, and the like. Closely related is the lithium/sulfur dioxide system. The lithium/sulfur chloride primary system, for example, employing lithium/sulfuryl chloride primary system, for example, employing LiAlCl$_4$ as the conductive electrolyte salt and porous carbon black cathodes have been of special interest because of their high open circuit voltage, excellent low temperature performance and greater construction and packaging efficiencies.

During cell discharge, the lithium anode is oxidized and the liquid sulfuryl chloride is reduced at the carbon cathode so that the overall cell reaction is of the type.

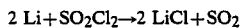

2 Li+SO$_2$Cl$_2$→2 LiCl+SO$_2$

Despite the important advantages of the lithium oxyhalide systems, there are performance problems which have hindered their wide acceptance. For instance, upon high rate cell discharge, lithium chloride builds up and fills the pores of the carbon cathode; the battery voltage and current outputs decay rapidly at only a low depth of discharge. In addition, after any period on open circuit these cells have an initial low operating voltage (i.e. exhibit a voltage delay) on recommencement of discharge. During storage, particularly at elevated temperatures, the lithium anode tends to develop a passivating film which leads to this delay phenomenon.

Following the empirical method, various approaches have been taken to overcome the foregoing limitations associated with oxyhalide electrochemical cells. Carbon cathode comparison studies for lithium/sulfuryl chloride cells were described by Wade et al in Proc. of the Workshop on the Electrochemistry of Carbons, Vol. 84-85, pages 479-91 (1983) wherein various carbon powders as potential substrate materials were tested. Wade et al concluded that carbon properties, such as surface area, particle size, porosity, ash content and pH should all be important in selecting a carbon black for cathode applications since electrode surfaces may actively participate in electrochemical reaction sequences. Wade et al recognized the presence of naturally occurring reactive groups such as carboxylic acids, lactones, phenols, ketones and quinone moieties. But a general lack of understanding of performance characteristics was acknowledged including the influence of such reactive groups on cell output voltage and cathode capacity etc.

Wade et al also studied Shawinigan acetylene black pretreated with solvents, eg acetone, thionyl chloride and methanol. In addition, starting carbon black powders were acidified or made basic by pretreatments with nitric acid or ammonium hydroxide which treated substrates were rinsed with water and dried. Cathodes were prepared in the same manner as untreated carbons. According to the authors, these pretreatments were done to partially neutralize surface oxygen functional groups existing on the carbon. Wade et al failed to suggest the addition of nitrogen functionality to carbons in their pretreatments. In addition, acid and base treatments had a lesser effect on final cathode performance than acetone and methanol washing causing Wade et al to conclude that mild pretreatments with acid or base are insufficient to modify surface groups on the carbon substrate.

Walker et al, J. Electrochem. Society, Vol. 132, 1536 (1985), who oxidized Shawinigan carbon black with alkaline KMnO$_4$ solution, found that cathode operating voltage and specific cathode capacity were severly decreased in a thionyl chloride system.

Most recent improvements have dealt with the anode rather than the cathode. Thus, efforts to offset the passivating coating of the anode provided for use of polymer films to coat the lithium anode. U.S. Pat. No. 4,170,693 discloses the use of methyl and ethyl cyanoacrylates. U.S. Pat. No. 3,993,501 provides for coating the active metal anode with a thin adherent vinyl polymer film. U.S. Pat. No. 4,020,240 discloses the use of a chloroborate electrolyte salt for reducing passivation of the metal anode, and thus help reduce the voltage delay associated with start-up after storage at elevated temperatures. U.S. Pat. No. 4,093,784 discloses improved cell performance by coating the lithium anode with calcium. In contrast, few improvements exist for cathodes, and these have been limited to mostly physical incorporation of catalytic substances such as metal phthalocyanines, as described in U.S. Pat. No. 4,252,875. Likewise, U.S. Pat. No. 4,167,608 discloses high energy-density lithium/thionyl chloride electrochemical cells with particulate copper dispersed in the carbon current collector. This was done to lower the impedance and reduce the risk of explosion associated with elemental sulfur reacting with lithium. Despite the many improvements made in high energy density batteries especially oxyhalide cells, state of the art technology in this field has not entirely lived up to expectations, mainly as a result of safety concerns, specific capacity limitations of carbons, rate capability, self-discharge, limited cell life and storage capabilities, voltage delay, and lack of utility in secondary cell applications.

SUMMARY OF THE INVENTION

Accordingly, it is a principal object of the present invention to provide novel, chemically modified carbons for electrochemical cells, and more particularly, carbons chemically modified with "surface" treatments of the reactive sites on carbon structures which modify them with covalently bonded nitrogen-containing functionality such as amino, amido, imino nitro, quaternary ammonium, cyano and others. The carbons may also have these reactive sites treated to increase oxide functionality with or without nitrogen containing groups being added thereafter.

More specifically, it is a principal object to provide chemically modified carbons which are specially useful in electrodes for both energy producing electrochemical cells and energy consuming cells for electrochemical synthesis of products, the modified carbons for such electrodes comprising nitrogen containing groups bonded to elemental carbons where the nitrogen containing groups have the formula:

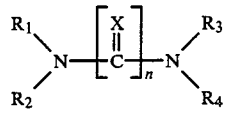

wherein n is 0 or 1; X is O, S or N—$R_5$, at least one of the substituents $R_1$–$R_5$ is a site of covalent bonding to said elemental carbon and the remaining R substituents are hydrogen, alkyl, alkoxy, aryl, aralkyl, hydroxy, quaternary ammonium, amino, amido, imino, acyl or nitro, or the remaining R substituents in groups selected from $R_1$ and $R_2$, $R_3$ and $R_4$, $R_1$ and $R_3$, $R_2$ and $R_4$, and $R_5$ with other R's together with their respective nitrogens forming a 4 to 7 membered heterocyclic ring.

In addition to nitrogen-functionalized carbons for electrochemical cells, it is a further principal object to provide for improved energy producing electrochemical cells comprising the foregoing modified carbons, the cells having greater capacity, higher open cell voltage, minimal voltage delay, improved storage capability, shelf life and safety. This would include energy producing electrochemical cells with improved performance characteristics, which comprise a cathode, an anode and an electrolyte wherein the cathode comprises the oxidized carbon having sufficient oxygen functionality added with or without the added nitrogen-containing groups to produce at least a 5 percent improvement in one or more performance characteristics over an otherwise equivalent cell comprising an untreated carbon cathode. By the expression "energy producing electrochemical cell" it is intended to mean a battery, but more generally, any cell in which the anode, cathode, electrolyte or fuel introdued into the cell is consumed during discharge to produce a useful energy output. The expression "useful energy output" is intended to mean a cell which supplies sufficient power to operate the device with which it is being used.

The electrochemical cells of the present invention also include energy consuming types comprising a cathode, an anode and an electrolyte wherein at least one electrode comprises a carbonaceous material, eg carbon, modified with the oxygen and/or nitrogen-containing groups.

For purposes of this invention expressions like "nitrogen-containing groups", "nitrogen containing functionality", "nitrogen modified carbon", or "nitrogen functionalized carbon" are intended to mean any nitrogen-containing moiety which is covalently bonded to the elemental carbon either directly or through covalently linked atoms bonded to the elemental carbon, and excludes (1) trace amounts of naturally occuring nitrogen which may be present in the carbon and (2) complex organometallic heterocyclic nitrogen containing groups covalently bonded directly to the elemental carbon or through other atoms, such as cobalt phthalocyanines, porphyrins and similar nitrogen-containing groups. Also for purposes of the present invention the terms "cell" and "battery", whether containing one actual energy producing cell or several are used interchangeably.

Various energy producing electrochemical cells are contemplated, including those having a "liquid cathode", such as sulfur dioxide, thionyl chloride, sulfuryl chloride, phosphorous oxychloride, and the like, in which the liquid cathode performs as both a solvent for the electrolyte salt and as cathode depolarizer. The electrolyte salt may be any salt which is both soluble and stable in the liquid cathode, stable to the metal anode and possesses high ionic conductivity. This would include, for instance, lithium tetrachloroaluminate, lithium perchlorate, lithium hexafluoroarsenate, lithium tetrachlorogallate, and $Li_2B_{10}Cl_{10}$. The present invention includes high energy density batteries for example, having a liquid cathode, like thionyl chloride in combination with a lithium metal anode or alloy thereof, or a calcium metal anode or alloy thereof which provides a cell couple having a high voltage (ie about 2.5 to about 4 volts), large discharge capacity and good stability. Cells of lower voltage (ie about 1.0 to 2.5 volts) are also contemplated for other important battery systems containing carbons such as metal air batteries, alkaline batteries and nickel-cadmium batteries.

In addition to an anode, an active cathode depolarizer and ionically conductive electrolyte, the improved energy producing cells disclosed herein may require a cathode current collector for external electrical contact to be made with the active cathode material. The current collector preferably comprises high surface area carbons modified with the nitrogen containing groups discussed above and described in greater detail below.

The novel modified carbons described herein also find applications in secondary energy producing electrochemical cells, such as the nickel-cadmium (Ni/Cd) system, wherein they serve as the conductive support matrix. The modified carbons are useful in fuel cells and metal/air batteries, like zinc-air or oxygen or iron-air or oxygen which employ a porous carbon cathode. In addition to the foregoing, the modified carbons are useful in solid cathode rechargeable cells like lithium/titanium disulfide and lithium/molybdenum trisulfide which use carbon powder as a conductor to facilitate the cell reaction.

DESCRIPTION OF THE PREFERRED EMBODIMENTS

Carbon electrodes constitute an integral component of many electrochemical cell systems, whether energy producing or energy consuming. The carbon for the electrochemical cells comprises carbon black, which preferably for liquid cathode systems, fuel cells and metal air or oxygen batteries has a high porosity and/or high surface area for efficient substrate feed or discharge product collection and performance. According to the invention elemental carbon, which is intended to include amorphous carbons, eg carbon blacks, crystalline carbons, eg graphitic carbons, and amorphous carbons at least partially graphitized, is modified by preoxidizing and/or chemically functionalizing naturally occurring carbon surface moieties. The scope of useful carbons in this invention is not intended to be limited to the specific examples indicated hereinabove, but is intended to include all useful carbons for electrochemical cells, including various physical forms of carbons, such as powders, plates, rods, foams, felts, fibers, cloths, etc. It was discovered that oxidation pretreatment of carbon enhances rate capability and cathode capacity, particularly in the lithium/sulfuryl chloride system. Further, it was discovered that oxidation and conversion of the moieties to nitrogen-containing functionality can increase cell capacity and improve performance.

The terms "oxidation" and "preoxidizing" with regard to the carbon are intended to mean the introduction of oxygen functionality on elemental carbon structures at levels in excess of those present before such development. The introduction of oxygen functionality (also referred herein as carbon oxide functionality) into carbon structures can be achieved chemically or electrochemically. Chemical oxidation methods are performed by reaction of the carbon in aqueous or nonaqueous media containing oxidizing agents like nitric acid, potassium permanganate, sodium hypochlorite and ammonium persulfate. Chemical oxidation also includes reaction of the carbon with an oxidizing gas, such as by thermal methods where the carbon is heated in the presence of oxygen, air or carbon dioxide. Chemical oxidation of carbon has been decribed by H. P. Boehm, et al, Angew Chem. Internat. Edit, 3,669 (1964) and, *Anorg. Chem.* 353,236 (1967).

Alternatively, carbons may be electrochemically preoxidized for example, in 15 percent aqueous sulfuric acid by polarizing the carbon anodically. Electrochemical oxidation of carbon is described by N. L. Weinberg and T. B. Reddy, *J. Appl. Electrochemistry* 3, 73 (1973). Using such methods, the principal carbon oxide species formed are the strongly acidic carboxylic acid, weakly acid phenolic hydroxyl and carbonyl groups.

The elemental carbon, which may or may not be preoxidized is modified by covalently bonding nitrogen-containing groups thereto either directly, or indirectly through covalently linked atoms other than nitrogen. The modified carbon contains from about 0.001 percent to about 20 percent by weight nitrogen, or an amount sufficient to provide at least a 5 percent improvement in one or more performance characteristics (e.g. increased capacity, increased voltage, decreased delay time, increased cycle life, improved product yield, improved current efficiency, improved product specificity, etc.) tested under identical conditions over electrochemical cells having electrodes comprising unmodified carbons. It is to be understood that the performance characteristics will vary for different electrochemical cells as well as their use applications and any specific group of performance characteristics mentioned herein is not intended to be all inclusive, but only representative.

The nitrogen containing groups of the modified carbons include amines, amides, imines, quaternary ammonium, hydrazines, hydrazides, ureides, thioureides, guanidines, heterocycles and mixtures thereof. As disclosed above, the present invention contemplates elemental carbon modified with nitrogen-containing groups of the formula:

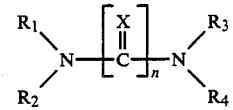

wherein the values for n, $R_1$, $R_2$, $R_3$, $R_4$ and X are as stated above. This would include nitrogen-containing groups of the above formula in which the R substituents are alkyl groups having from 1 to 10 carbon atoms; aryl and aralkyl are unsubstituted phenyl or phenyl substituted with alkyl, aralkyl, halo, haloalkyl, carboxy, hydroxy, amino, amido, quaternary ammonium, nitro, carboxyester.

Specific representative examples of nitrogen containing groups covalently bonded to carbon in accordance with this invention include but are not limited to the following, wherein Gr or Gr' is intended to mean different sites of bonding to the carbon.

(a) Inorganic nitrogen-containing groups:

| | | |
|---|---|---|
| Gr=N—Cl | Gr=N—H | Gr—$NH_2$ |
| Gr=N—Gr | Gr=N—OH | Gr=N—N=Gr' |
| Gr—NHGr' | Gr=N—$NH_2$ | Gr—$N_2$+Cl— |
| Gr—$NH_3$+$CF_3CO_2$— | Gr—$NHNH_2$ | Gr=N—$NO_2$ |
| Gr—NO | Gr—$NO_2$ | Gr—$ONO_2$ |

(b) Amines:

| | |
|---|---|
| Gr—$NHCH_3$ | Gr—$NHC_6H_5$ |
| Gr—$N(CH_3)_2$ | Gr—$NHCH_2CH_2CH_2SCH_3$ |
| Gr—$N(C_6H_4$—pCl$)_2$ | Gr—$NHCH_2CH_2NH_2$ |
| Gr—NHCN | Gr—$NHCH_2CH_2S$—Gr' |
| Gr—$NH_2CH_3$+Cl— | Gr—N—$(CH_2CH_2Cl)_2$ |
| Gr—$OCH_2CH_2NH_2$ | Gr—$CH_2NH_2$ |
| Gr—$(CH_2)_5NHCH_3$ | Gr—$CH_2C_6H_4(p)NH_2$ |
| (Gr—$CH_2CH_2)_2$NH | Gr—$S(CH_2)_3N(CH_3)_2$ |
| Gr—$NH(CH_2)_3CO_2H$ | Gr—$NHCH_2CO_2CH_3$ |

(c) Amides:

| | |
|---|---|
| Gr—$CONH_2$ | Gr—$NHCOCH_2CH_2CONHGr'$ |
| Gr—NHCOH | Gr—NHCOCONH—Gr' |
| Gr—$NHCOC_6H_4$—(p)Cl | Gr—$NHSO_2C_6H_5$ |
| Gr—$SO_2NH_2$ | Gr—$P(O)(CN)[N(CH_3)_2]$ |
| Gr—$C(S)N(CH_3)_2$ | |

(d) Hydrazines:

| | |
|---|---|
| Gr—$NHNH_2$ | Gr—$N(CH_3)N(CH_3)_2$ |
| Gr—NHNH—Gr' | Gr—$NHN(CH_3)_2H+CH_3SO_3$— |
| Gr—$CH_2OCH_2NHNH(CH_3)$ | Gr—$NH(CH_2)_4NHNH_2$ |
| Gr—$NHNHC_6H_5$ | Gr—$COCH_2CH_2NHN(C_4H_9)_2$ |

(e) Hydrazides:

| | |
|---|---|
| Gr—$CONHNH_2$ | Gr—$OCH_2CONHNH_2$ |
| Gr—$CONHNHC_6H_4(p)NO_2$ | Gr—$SO_2NHNHC_6H_5$ |
| Gr—CONHNHCO—Gr' | $GrC(S)NHNH_2$ |

(f) Quaternary ammonium salts:
(Where $X^-$ is a suitable anion such as halide ($Cl^-$, $Br^-$, $F^-$, $I^-$), $AlCl_4^-$, sulfate, phosphonate, acetate, $BF_4^-$, $PF_6^-$, $AsF_6^-$, $ClO_4^-$, p-toluenesulfonate, etc.)

| | |
|---|---|
| Gr—N(CH₃)₃⁺X⁻ | Gr—CH₂CH₂N(CH₃)₃⁺X⁻ |
| Gr—N(C₄H₉)₃⁺X⁻ | Gr—O(CH₂)₇N(C₄H₉)₃⁺X⁻ |
| Gr—N(CH₃)(C₂H₅)₂⁺X⁻ | Gr—NH(CH₂)₂N(C₃H₇)₃⁺X⁻ |
| Gr—N(CH₃)(C₆H₅)₂⁺X⁻ | Gr—N(Gr¹)(CH₃)₂⁺X⁻ |

(g) Imines:

| | |
|---|---|
| Gr=NCH₃ | Gr=NC₆H₄(p)F |
| Gr=N—(CH₂)₃Gr' | Gr—CH₂CH=NC₂H₅ |
| Gr—C(CH₃)=NH | Gr—C(C₆H₅)=N—Gr' |
| Gr—NH₂C₆H₅+AlCl₄⁻ | Gr—N=C(Cl₂) |
| Gr—C=NC₆H₅(N(CH₃)₂) | |

(h) Ureides:

| | |
|---|---|
| Gr—NHCONH₂ | Gr—N(Gr')CONH₂ |
| Gr=NCONH₂(CH₂)₉CH₃ | Gr=NCON=Gr' |
| Gr—NHCONH—Gr' | Gr=NNHCONH₂ |
| Gr—CONHNHCONHC₆H₅ | Gr—CH₂CH=NCONH₂ |

(i) Thioureides:

| | |
|---|---|
| Gr—NHC(S)NH₂ | Gr—N(Gr')C(S)NH₂ |
| Gr=NC(S)NH₂ | Gr=NC(S)N=Gr' |
| Gr—NHC(S)NHGr' | Gr—NNHC(S)NH₂ |
| GrCONHNH₂C(S)NHC₆H₅ | Gr—CH₂CH=NC(S)NH₂ |

(j) Guanidines

| | |
|---|---|
| Gr—NHC(=NH)NH₂ | Gr—N(Gr')C(=NH)NH₂ |
| Gr=NC(=NH)NH₂ | Gr=N(C=NH)N=Gr' |
| Gr—NHC(=NH)NH—Gr' | Gr=N(C=NGr')NH₂ |
| Gr—CONHNH₂C(=NH)NHC₆H₅ | Gr—NHC(=NG'NH₂ |

(k) Representative nitrogen containing heterocycles: These include nitrogen containing heterocycles comprising 4 to 7 atoms in the rings, with one to three ring atoms being nitrogen, and the remainder being of carbon and/or another atom such as oxygen or sulfur. These heterocycles are attached to at least one elemental carbon site as for example in structure A, or two different elemental carbon sites as for example in structure B. Such heterocycles may also be formed from two adjacent elemental carbon sites, as for example in structure C, and may be unsaturated or aromatic in character as for example in structure D.

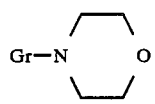

A

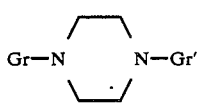

B

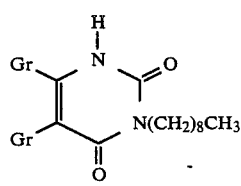

C

D (l) Miscellaneous kinds of nitrogen containing groups:

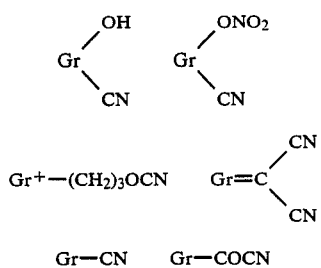

Gr—CN    Gr—COCN

Gr-NH - (polymer), where the polymer is polyethylene, polyacrylamide, etc.

In the synthesis of these new carbons with nitrogen-containing groups covalently bound to carbon we take advantage of the carbon-oxygen functionality which is present and covalently attached to carbon, such as carbonyl groups (quinone, lactone, ketone) hydroxy groups (phenol, alcohol, and carboxylic acid groups). The concentration of these various groups may be increased by preoxidation of the carbon with such reagents as aqueous or non-aqueous solutions of $KMnO_4$, $NaOCl$, $(NH_4)_2S_2O_8$, or preoxidation in air, oxygen or carbon dioxide, for example at higher temperatures. Alternatively, electrochemical oxidation may be employed to introduce such oxygen functionality. This carbon-oxygen functionality is known to occur primarily at the edge sites, grain boundaries and dislocations of carbons. The relative concentrations of the kinds of carbon oxygen functionality may be further increased or decreased by such methods as heat treatment above about 200° C. where decarboxylation or carboxyl groups occurs or by reduction with suitable reagents. Thus reduction by $LiAlH_4$ in either solution causes carboxy groups to be converted to hydroxymethyl (—CH₂OH) groups and all carbonyl groups to hydroxy groups. In contrast, treatment with aqueous $NaBH_4$ solution converts only the more readily reducible carbonyl groups to hydroxy groups.

These various carbon-oxygen functionalities may then be converted to nitrogen-containing groups attached covalently to carbon using known chemical reactions. See for example "Compendium of Organic Synthetic Methods" (Volume I to V, 1971 to 1984), John Wiley & Sons, Inc.; "Principles or Organic Synthesis", by Norman, Chapman and Hall, 1978; "Modern Synthetic Reactions", by House, W. A. Benjamin, Inc., 1972). Thus, carboxylic acid groups react with ammonia at elevated temperatures to form the primary amide group (—CONH₂). Reaction of carboxylic acid groups with $SOCl_2$ forms carboxylic acid chloride groups (—COCl) which are readily converted to primary, secondary or tertiary amides by reaction with ammonia, a suitable primary amine or a suitable secondary amine, respectively. These covalently bonded amide groups are readily reduced to the corresponding amide groups by reduction with a reagent such as $LiAlH_4$ or $NaBH_4$, by catalytic reduction with $H_2$, or by electrochemical reduction, to name a few methods. Carboxylic acid and carboxylic acid chloride groups can also be reacted with hydrazine, urea, thiourea, guanidine, and substituted derivatives of such to form hydrazines, ureides, thioureides and guanidine derivatives. Likewise carbonyl groups may be reacted with ammonia to form imines (—C=NH), hydroxylamines to give oximes (—C=NOH), and hydrazines to produce hydrazones (—C=N=NH$_2$). A further range of useful covalently bonded nitrogen-containing groups can be formed by reduction of these groups or by well known reactions, which for example substitute available hydrogens on nitrogen with alkyl, aryl, heterocyclic aromatic etc. groups. Amines can also be formed from phenolic hydroxy groups by reaction with ammonia, $SO_2$ and water at elevated temperatures.

In instances where two or more carbon oxygen functionalities are on adjacent positions in the elemental carbon, heterocyclic rings containing nitrogen functionality may form on reaction of the carbon with reagents such as hydrazine, urea, thiourea, guanidine and substituted derivatives of such. These reactions may be depicted in the following examples;

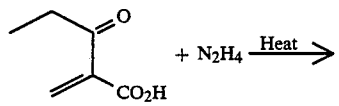

Carbon oxides

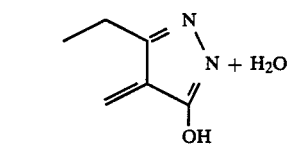

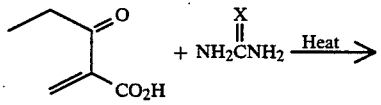

Carbon Oxides

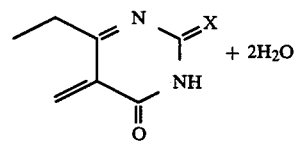

where X is O, S, or NH

Substituted derivatives of these reagents, where one or two hydrogens on nitrogen are substituted by alkyl, aryl or other suitable groups, may be employed to form substituted, heterocyclic rings under reaction conditions which would be apparent to one of ordinary skill in the art. In addition, heterocyclic rings containing nitrogen covalently bonded to carbon may be prepared in single or multistep processes starting with suitable amines or amides. For example reaction of phthalic anhydride with primary amine groups at elevated temperatures forms phthalimide groups.

Amine groups once formed, may be further quaternized to form quaternary ammonium groups (—NR$_4^+$) which are positively charged moieties. Quaternization of amine groups is possible using such reagents as dialkyl sulfates or alkyl halides, using methods which are standard for preparing quanternary salts.

A further method of introducing nitrogen groups covalently bonded to carbon is by electrophilic aromatic substitution of available carbon-hydrogen sites, directly by nitration, for example using nitric acid in acetic anhydride, or other nitrating reagents. In a similar manner nitrosation may be accomplished with sodium nitrite and hydrochloric acid. Reduction of nitro or nitroso functionality leads to amino groups, which again are sites for further reactions. In an alternative approach these available carbon-hydrogen sites may be catalytically halogenated with say $Cl_2$, $Br_2$ or $I_2$ and the corresponding halogenated carbon subsequently reacted, under nucleophilic aromatic substitution conditions, with say primary or secondary amines or hydrazines to form the corresponding amine or hydrazine derivative. In a similar manner, the carbon may be sulfonated first with say oleum, and the corresponding sulfonic acid group converted by reaction with a reactive nitrogen molecule to form substituted sulfonamides (—C—SO$_2$NR$_2$).

A primary amino group directly attached covalently to the carbon as in anilines is a useful site for formation of the diazonium group by reaction of the amino group with nitrous acid solution. Diazonium groups can be reacted in well-known reactions of organic synthesis, to form cyano (—C—CN), nitro (—C—NO$_2$) or hydrazine (—C—NHNH$_2$) groups, or coupled with tertiary aromatic amines, phenols, enols, pyrroles and other reagents to form a variety of new carbons containing nitrogen groups covalently bonded carbon.

Alternative routes for preparing nitrogen-groups covalently bonded to carbon such as ureides include heating the carbon with ammonium carbonate, ammonia and carbon dioxide, and cyanamide in water.

As previously indicated, the modified carbons of the invention find broad application in a wide range of electrochemical devices. The carbons, for example, are readily adaptable to energy consuming cells for electrochemical synthesis. For example, electrosyntheses using nitrogen functionalized carbons, lead to increased current efficiencies and/or product selectivity, as for example, in synthesis of ethylene glycol by electrohydrodimerization of formaldehyde. Other examples include formation of $H_2O_2$ by electroreduction of $O_2$, electrocarboxylation of olefins, and the Kolbe electrosynthesis of dimethyl sebacate from monomethyl adipate. They are especially well suited for energy producing devices like fuel cells and metal-air batteries, primary and secondary batteries, like AA flashlight batteries, power cells for watches and calculators, as well as medical devices like hearing aids, cardiac pacemakers, and other implantable devices where carbon is an integral component of the power source. This would include lithium primary systems where carbon or graphite powder is used in the conductive matrix, particularly those having solid cathode organic electrolyte systems, like vanadium pentoxide, manganese dioxide, copper chloride, silver chromate and carbon monofluorides. The nitrogen modified carbons also find important application in alkaline type batteries such as Ni/Cd or alkaline MnO$_2$ where up to about 30wt % acetylene black can be employed as the conductive support for improved discharge performance.

The carbons of the invention are particularly useful in primary high energy-density systems employing soluble liquid cathodes previously described, including rechargeable lithium-sulfur dioxide batteries which use porous carbon black electrodes for the catalytic reduction surface.

In the construction of cells or batteries of the invention, a large variety of enclosures can be employed, formed from inert materials of construction like high density polyethylenes, polypropylenes, and perfluorinated polymers, such as PTFE. Generally, the cells will be constructed so as to permit maintaining an inert atmosphere within the cell closure while excluding atmospheric moisture. The electrodes are constructed of conductive materials previously identified. Typical cell designs would include, for example, spirally wound cell stack jelly roll, cylindrical cells, and button cells all of known configuration. Other more specific aspects of cell construction, such as geometry or arrangement of electrodes within the cell closure and size of electrodes are matters of routine consideration and form no part of this invention.

The following specific examples demonstrate the various aspects of this invention, however, it is to be understood that these examples are for illustrative purposes only and do not purport to be wholly definitive as to conditions and scope.

EXAMPLE 1

Surface Oxide Formation On Carbon

A. An aqueous solution of 12.5wt/wt% sodium hypochlorite (240ml) was added to Shawinigan acetylene black (50g), and sufficient distilled water and isopropyl alcohol added to crease a slurry. The mixture was magnetically stirred at ambient temperature for a 24 hour period. The carbon/hypochlorite mixture was then filtered and the filtrate washed well with distilled water to remove residual oxidant and byproducts. The carbon filter cake was soaked for an hour in 0.1N HCl to reprotonate any carboxylate functionality on the carbon surface, filtered, and washed again with distilled water to remove any halide byproducts such as HCl and NaCl. The oxidized carbon was then dried at 125° C. at 30mm Hg in a vacuum oven for 16 hours, ground to a powder, and further dried under the same conditions for 6 to 8 hours.

The surface oxide functionality was determined by elemental analysis as well as by titration. Titrations were performed by first neutralizing the carbon sample in standarized aqueous base (0.01N NaOh, or 0.01N NaHCO$_3$), removing the neutralized carbon by filtration, and back titrating the aqueous filtrate with standardized aqueous acid (0.01N HCl). The NaOH solution neutralizes both strong (—CO$_2$H) and weak acid (—OH) species, whereas the NaHCO$_3$ solution reacts with only the strong (—CO$_2$H) species. The difference between the two titrations is the phenolic hydroxyl (—OH) content. Table 1 below compares the oxidation data with that of unoxidized Shawinigan acetylene black.

B. An alternative method was used for developing carbon oxide functionality by means of an aqueous solution of 1M ammonum persulfate (400ml) added to the Shawinigan carbon black (50g) with sufficient excess distilled water to create a slurry. This mixture was stirred at ambient temperature for approximately 24 hours. The slurry was then vacuum filtered, washed well with water, reprotonated and rewashed, and dried as in Example 1A. Analytical results for the carbon oxide functionality are given in Table 1.

C. In an alternative method to 1B, an aqueous solution of 1M ammonium persulfate (400ml) was added to Shawinigan acetylene black (50g) with sufficient additional distilled H$_2$O to create a slurry. The mixture was heated with stirring at 70° C., for 1 hour. After cooling to ambient temperature, the carbon slurry was stirred overnight, and then vacuum filtered, washed well with water reprotonated and rewashed and dried as in Example 1A. Analytical results for the carbon oxide functionality are given in Table 1.

TABLE 1

| SURFACE OXIDE FUNCTIONALITY AND ELEMENTAL ANALYSIS OF SHAWINIGAN ACETYLENE BLACK (SAB) | | | |
|---|---|---|---|
| CARBON SAMPLE | [—CO$_2$H], meq/g | [—OH], meq/g | % O |
| Unoxidized SAB | 0.08 | 0.12 | 0.05 |
| Carbon, Example 1A; NaOCl | 0.16 | 0.56 | 2.64 |
| Carbon, Example 1B; (NH$_4$)$_2$S$_2$SO$_8$ | 0.11 | 0.12 | 1.11 |
| Carbon, Example 1C; (NH$_4$)$_2$S$_2$O$_8$; 70° C. | 0.46 | 0.26 | 3.27 |

The results in Table 1 show that unoxidized Shawiningan acetylene black (SAB) contains a naturally occuring amount of titrateable oxide functionality, which is considerably increased by chemical oxidation, especially at elevated temperature, to provide enhanced quantities of both the strong and weak functional groups.

EXAMPLE 2

Amide Derivatives of Carbon

A. A tertiary amide derivative of unoxidized Shawinigan acetylene black was prepared by magnetically stirring 50g of carbon in 400ml of anhydrous toluene, while 10ml of thionyl chloride was slowly added dropwise. After stirring a further 16 hours, the excess of thionyl chloride was then distilled off, the reaction mixture cooled, and 10ml of N,N-dimethylamine in 50ml of toluene was slowly added by means of a dropping funnel. The mixture was stirred for a further 6 hours, excess distilled water was added, and the carbon product was filtered, washed well with dilute hydrochloric acid, water and isopropyl alcohol and then dried in vacuo.

B. The primary amide derivative was formed by reacting the unoxidized carbon-toluene-thionyl chloride mixture of part A directly with an excess of ammonia gas, which was slowly bubbled through the mixture for 1 hour. The product was isolated by filtration, washed with acid and water, and dried as described above.

C. A secondary amide derivative of the oxidized carbon, synthesized following the procedure of Example 1C, was prepared by reacting the oxidized carbon-toluene-thionyl chloride reaction mixture directly with excess monoethylamine dissolved in toluene. This was stirred for 6 hours, water added, and the carbon functionalized with secondary amide groups, was filtered; washed with acid and water, and dried as described above.

Table 2 provides analytical results of strong [—CO$_2$H] acid content as well as elemental analysis for nitrogen in the above carbons.

TABLE 2

SURFACE NITROGEN FUNCTIONALITY AND ELEMENTAL ANALYSIS OF SHAWINIGAN ACETYLENE BLACK (SAB)

| CARBON SAMPLE | NITROGEN FUNCTION | [—$CO_2H$], meq/g | % N |
|---|---|---|---|
| Unoxidized SAB* | — | 0.08 | 0.0005 |
| SAB, Example 1C* | — | 0.46 | Nil |
| SAB, Example 2A | Tertiary Amide | 0.04 | 0.05 |
| SAB, Example 2B | Primary Amide | 0.06 | 0.23 |
| SAB, Example 2C | Secondary Amide | 0.24 | 0.01 |

*Controls

Table 2 demonstrates that nitrogen functionality has been introduced into the carbon. Consistent with this introduction, the level of titratable carboxylic acid groups is significantly lowered and the percentage of nitrogen is significantly increased, compared to the starting carbon material. These results, taken together with the manner of preparation, provide good evidence for the formation of covalently bonded nitrogen functionality in amide form, to carbon.

EXAMPLE 3

Amine Derivatives of Carbon

The tertiary amide prepared according to the procedure of Example 2A was reduced by stirring a 25g sample of the dried amide in 500ml of dry diethyl ether in a 3-neck flask equipped with a condenser and a dropping funnel containing a 10-fold excess of $LiAlH_4$ in ether. The $LiAlH_4$ solution was added dropwise over 2 hours, the reaction mixture quenched with water, and then filtered. The carbon filter cake was washed well with water, dilute hydrochloric acid and again with water, and dried as described in Example 1. This tertiary amine-functionalized carbon had 0.05% nitrogen present by elemental analysis. Similarly, the primary amide of Example 2B was converted to the primary amine with 0.12% nitrogen present, according to elemental analysis.

EXAMPLE 4

Reaction of Carbon With Urea

A. Unoxidized Shawinigan acetylene black (SAB), 50g, and urea, 30g, were thoroughly mixed and the mixture placed in a 1 liter Parr pressure vessel. The sealed apparatus was flushed with argon gas and the temperature raised to 150° C., resulting in a pressure of 300 to 400psi. After 40 hours, the vessel was cooled, flushed with argon, and the carbon powder was slurried with distilled water. The mixture was filtered and the carbon filter cake washed with water, dilute hydrochloric acid, again with much water, and then dried in vacuo as previously described in Example 1.

B. Oxidized SAB, prepared according to Example 1B where ammonium persulfate solution at ambient temperature was employed, and urea, were intimately mixed and reacted as in Example 4A.

C. Oxidized SAB, prepared according to Example 1C where persulfate solution at 70° C. was used, and urea, were mixed and reacted as in Example 4A.

Table 3 provides the data for titrations of strong and weak organic functionality as well as %N in the urea-derivatized carbon, compared the starting material carbons.

TABLE 3

UREA DERIVITIZED SAB CARBON

| CARBON SAMPLE | [—$CO_2H$], meq/g | [—OH], meq/g | % N |
|---|---|---|---|
| Unoxidized SAB* | 0.08 | 0.12 | 0.0005 |
| SAB, Example 1B* | 0.11 | 0.12 | Nil |
| SAB, Example 1C* | 0.46 | 0.26 | Nil |
| SAB, Example 4A | 0.12 | 0.75 | 3.19 |
| SAB, Example 4C | 0.02 | 1.03 | 6.87 |

*Controls

The results of Table 3 demonstrate that urea treatment of carbon causes a large increase in covalently bonded nitrogen as well as a large increase in the weak acid [—OH] content, while in two of the three cases, there is a significant decrease in strong acid [—$CO_2H$] content. The product of this reaction is, therefore, believed to comprise substances such as pyrimidine derivatives of carbon, known to have weak acidic phenolic-like hydroxyl groups, as well as reaction products of urea with both carboxylic acid groups or ketone groups producing ureide-type derivatives.

EXAMPLE 5

Reduction of Urea Treated Carbons

The urea treated carbons of Example 4 were reduced with $LiAlH_4$ in ether following the general procedure outlined in Example 3. The work-up was also similar. Table 4 compares the titration and elemental analysis for nitrogen, for reduction of carbons of Example 4A, 4B, and 4C, herein denoted carbons, Example 5A, 5B, and 5C respectively.

TABLE 4

Reduction of Urea Derivitized SAB Carbons

| CARBON SAMPLE | [—$CO_2H$], meq/g | [—OH], meq/g | % N |
|---|---|---|---|
| Carbon, Example 5A | 0.04 | 0.22 | 0.61 |
| Carbon, Example 5B | 0.08 | 0.49 | 6.76 |
| Carbon, Example 5C | 0.16 | 0.37 | 1.77 |

Table 4 shows that considerable covalently bonded nitrogen functionality remains after $LiAlH_4$ reduction. This functionality is likely to be in a reduced nitrogen functionalized carbon form.

EXAMPLE 6

Reaction of Hydrazines with Carbon

A. Unoxidized SAB (50g) was placed in a round bottom flask, and 1.5 liters of distilled water with 5ml isopropanol was added and stirred to form a slurry. A total of 5.2g hydrazine dihydrochloride was mixed with 7g sodium acetate in 100ml distilled water. The solution was adjusted to pH 7 with sodium hydroxide and this was added dropwise to the carbon slurry. The carbon mixture was then refluxed for 6 hours, then heating discontinued, and the mixture was stirred for 72 hours. The slurry was filtered, washed and dried as in the above examples.

B. In a similar manner to the above, 50g of oxidized SAB, prepared according to the procedure of Example 1C was treated with hydrazine, and the covalently bonded nitrogen derivative of carbon was isolated.

C. Unoxidized SAB (50g) in 1.5 liter of water containing a little isopropyl alcohol was stirred with 5ml of 97% phenylhydrazine and 7.3g of sodium acetate. The mixture was refluxed for 16 hours, cooled, filtered, washed with dilute acid, much water, and then dried in vacuo as described previously.

D. Unoxidized SAB (50g) in 1.5 liters of water containing a little isopropyl alcohol was stirred with 3ml of 98% methylhydrazine. The mixture was refluxed and then worked up, as described in Example 6C.

Table 5 presents the results of titration analysis and elemental analysis for nitrogen.

TABLE 5
REACTION OF SAB WITH HYDRAZINES

| CARBON SAMPLE | [—$CO_2H$], meq/g | [—OH], meq/g | % N |
|---|---|---|---|
| Unoxidized SAB* (Control) | 0.08 | 0.12 | 0.0005 |
| SAB, Example 6A | 0.01 | 0.09 | 0.29 |
| SAB, Example 6B | 0.25 | 0.10 | 0.17 |
| SAB, Example 6C | 0.02 | 0.08 | 0.37 |
| SAB, Example 6D | 0.02 | 0.06 | 0.46 |

The results of Table 5 demonstrate that covalently bonded nitrogen is attached to carbon, likely in the form of hydrazone and hydrazide derivatives, but also possibly existing in heterocyclic nitrogen groups.

EXAMPLE 7

Nitration of Carbon

A. Nitration of unoxidized Shawinigan acetylene black is accomplished by dropwise addition of 50ml fuming nitric acid to 50g of carbon in 700ml concentrated sulfuric acid. The slurry as mechanically stirred and the temperature during addition is kept between 70° and 90° C. by means of an external water bath. After the addition is completed, the reaction is heated on a steam bath for four hours, and then is allowed to cool to room temperature. The mixture is poured onto 700g of ice and 700ml of water. The carbon product is then filtered, washed well with water and isopropyl alcohol, and then dried in vacuo.

B. An alternative method is used for the nitration of carbon by means of nitronium tetrafluoroborate. A dry five-liter three-necked flask equipped with thermometer and mechanical stirrer is charged with 50g of carbon and 700m tetramethylene sulfone. Nitronium tetrafluoroborate (50g) is added in several portions while flushing the flask with nitrogen. Stirring is initiated, and the reaction mixture heated to 100° C. for one hour. After cooling to room temperature, the mixture is poured into 1L of ice water. The carbon product is filtered, washed well with water and isopropyl alcohol, and then dried in vacuo.

C. An alternative method is used for the nitration of carbon by means of acetyl nitrate. Fifty grams of carbon is added to 700ml of acetic anhydride in a five-liter three-necked flask equipped with thermometer and mechanical stirrer. The slurry is cooled to 0–5° C. by means of an external ice bath. Stirring is initiated and 20ml of concentrated nitric acid in 50ml of glacial acetic acid is added dropwise over three to four hours. The mixture is allowed to stand for two days. Aqueous hydrochloric acid (20%) is then added at 0° C. to the solution to hydrolyze the acetic anhydride. The carbon product is filtered, washed well with water and isopropyl alcohol, and then dried in vacuo.

EXAMPLE 8

Aryl Amine Derivative of Carbon

Preparation of an aryl amine derivative of Shawinigan acetylene black is accomplisehd by reduction of nitrated carbon synthesized in Example 7. Fifty grams of nitrated carbon is added to 700ml concentrated hydrochloric acid. Mechanical stirring is initiated and excess of zinc dust is added in portions. The temperature of the mixture is kept below 60° C. by means of an external water bath. After the zinc is added, the reaction is kept at 60° C. for one hour. Upon cooling, the carbon product is filtered, washed well with water, dilute aqueous NaOH, and water, and is then dried in vacuo.

EXAMPLE 9

Aryl Cyanide Derivative of Carbon

Preparation of an aryl cyanide derivative of Schawinigan acetylene black is accomplished by conversion to the diazonium salt of the previously synthesized aminated carbon from Example 8. Fifty grams of aminated carbon is added to 700ml of 25% aqueous hydrochloric acid. Mechanical stirring is initiated, and the slurry is cooled to 0° to 5° C. by means of an external ice bath. Twenty-five grams of sodium nitrite dissolved in 100ml water is slowly added to the reaction mixture over a 15 minute period. The reaction is set up in a well-ventilated fume hood and 20 grams of sodium cyanide dissolved in 75ml water is added dropwise with stirring, over a five minute period. After 30 minutes at room temperature, the carbon product is filtered in the fume hood, washed well with water, and dried in vacuo. The filtrate is neutralized and excess cyanide decomposed by reaction with bleach solution.

EXAMPLE 10

Azide Derivative of Carbon

Preparation of an azide derivative of Shawinigan acetylene black is accomplished by conversion to the diazonium salt of the previously synthesized aminated carbon from Example 8. Fifty grams of aminated carbon is added to 700ml of 25% aqueous hydrochloric acid. Mechanical stirring is initiated, and the slurry is cooled to 0°–5° C. by means of an external ice bath. Twenty-five grams of sodium nitrite dissolved in 100ml water is slowly added to the reaction mixture over a 15 minute period. Twenty-five grams of sodium azide dissolved in 100ml water is then added to the mixture, and allowed to warm to room temperature over a thirty minute period. The carbon product is filtered, washed well with water, and dried in vacuo. The filtrate is neutralized and excess azide decomposed by addition to 5% aqueous ceric ammonium nitrate solution.

EXAMPLE 11

Nitroso Derivative of Carbon

Nitrosation of oxidized Shawinigan acetylene black from Example 1A is accomplished by reaction with alkaline sodium nitrite. Fifty grams of oxidized carbon is added to 700ml of 0.5M sodium hydroxide. The solution is cooled to 0° C., mechanical stirring is initiated, and 40g of sodium nitrite is added. Concentrated sulfuric acid (120ml) is added dropwise via addition funnel, keeping the reaction temperature close to 0° C. by adding ice directly to the slurry. After one hour at 0° C., the carbon product is filtered, washed well with water, and dried in vacuo.

EXAMPLE 12

Phthalimide Derivative of Carbon

Preparation of aphthalimide derivative of Shawinigan acetylene black is accomplished by reaction of aminated carbon prepared in Example 8 with phthalic anhydride. Fifty grams of carbon and fifty grams of phthalic anhydride is added to 700ml glacial acetic acid, and refluxed for thirty minutes in a five-liter flask equipped with reflux condenser. After cooling to room temperature, the carbon product is filtered, washed with water and isopropanol, and dried in vacuo.

EXAMPLE 13

Lithium/SOCl$_2$ Batteries

Carbon electrodes comprising chemically modified carbons were fabricated by mixing 7wt % DuPont Teflon$^R$ 30 emulsion binder, the modified carbon, and isopropyl alcohol in an electric blender, until a homogeneous paste was formed. The alcohol was evaporated off in a vacuum oven at 100° C. and 30mm Hg, for 30 minutes and then at 125°–135° C. for 24 hours. The dried carbon-Teflon mixture was rolled and pressed onto a 0.15cm thick expanded metal screen (Exmet Corporation) of nickel cut to 2cm×2cm dimensions with a strip of the bare screen acting as an electrical contact for subsequent assembly into electrochemical test cells. Lithium electrodes were fabricated by pressing lithium foil (Foote Mineral Co.) on 0.114cm thick nickel Exmet$^R$ of dimension 2cm×2cm. As before, a bare strip of this screen was reserved for electrical contact. Nonwoven glass separator material was used as a separator to insulate cathode and anode. An efficient glove box was used to maintain a low humidity and oxygen content for electrode assembly and cell testing.

The Teflon test cell was of a square configuration with an electrode cavity to accomodate the flat plate electrodes. The electrode cavity was connected to an electrolyte reservoir. The chemically functionalized carbon cathode, separator, and lithium anode were layered and placed in the electrode cavity of the cell, a Teflon plug was inserted in place, and the electrolyte solution, consisting of excess 1.8M LiAlCl$_4$ in SOCl$_2$ was added to the reservoir, simultaneously filling the electrode cavity. After equilibrium for about 1 hour cells were discharged under constant resistive load. A 50 ohm load provided a cathode current density of 15mA/cm$^2$. Table 6 compares performance results for unoxidized Shawinigan acetylene black (SAB) with oxygen-and nitrogen-funcationalized carbons prepared according to the methods outlined in the previous examples. Specifically, the cell voltage at a 50% depth of discharge (V@50% DOD) and the ampere hour/g (Ah/g) capacity based on carbon to a 2.0V cut off are compared.

TABLE 6

DISCHARGE PERFORMANCE OF LI/SOCl$_2$ CELLS AT 15 mA/cm$^2$

| CARBON SAMPLE | CARBON FUNCTIONALITY | V @ 50% DOD | CAPACITY Ah/G (To 2.0 V Cut Off) |
|---|---|---|---|
| 1. Unoxidized SAB | Oxide | 2.75 | 1.94 |
| 2. Carbon, Example 1B | Oxide | 2.85 | 2.06 |
| 3. Carbon, Example 1C | Oxide | 2.80 | 1.24 |
| 4. Carbon, Example 4A | Urea Treated | 2.83 | 2.58 |
| 5. Carbon, Example 5A | Urea Treated-Reduced | 2.97 | 2.06 |
| 6. Carbon, Example 5C | Urea Treated-Reduced | 3.12 | 1.73 |
| 7. Carbon, Example 2A | Tertiary Amide | 2.95 | 2.55 |
| 8. Carbon, Example 3 | Tertiary Amine | 2.90 | 1.92 |
| 9. Carbon, Example 6A | Hydrazine Product | 2.72 | 3.19 |
| 10. Carbon, Example 6C | Phenylhydrazine product | 2.91 | 2.05 |

Table 6 demonstrates that there is a certain increased concentration level of carbon oxide functionality represented by persulfate oxidation of SAB at ambient temperature (Example 1B), which gives an increased (about 6%) cell capacity, based on the weight of carbon, compared to unoxidized SAB. However, over-oxidation, as shown in Example 1C, has a deleterious effect on capacity and little or no effect on the V@50% DOD. This optimal concentration range of carbon oxide functionality was not introduced by Walker et al, previously cited, who found that voltage and capacity were severly decreased on KMnO$_4$ oxidation of carbon which was subsequently employed in a thionyl chloride system.

Nitrogen functionalization is seen to cause significant performance increases in depth of discharge and/or capacity, over untreated SAB. Urea treated SAB exhibits about a 33% capacity increase, (Example 4A) whereas the reduced form of this carbon shows both a small capacity increase (6%) and voltage (8%). Surprisingly little nitrogen need be present in the covalently bonded nitrogen functionalized carbon to provide increased performance. Thus the tertiary amide and amine of Examples 2 and 3 respectively exhibit greater than a 5% increase of performance in cell voltage at 50% DOD, with as little as 0.05% by weight nitrogen present in the carbon. Likewise, the capacity improvements for the tertiary amide (31%) and hydrazine treated carbon (64%) are surprising.

EXAMPLE 14

Lithium/SO$_2$Cl$_2$ Batteries

Following the procedure of Example 8, electrodes were fabricated and placed in the Teflon cells, however, the electrolyte used to fill these test cells was 1.45 M LiAlCl$_4$ in SO$_2$Cl$_2$. Again the cells were discharged at 15mA/cm$^2$ and the voltage and capacity measured.

The results in Table 7 clearly demonstrate surprisingly large increases in cell voltage and/or capacity performance characteristics in Li/SO$_2$Cl$_2$ cells, resulting from increased carbon oxide formation (carbons of Examples 1A, 1B, and 1C) as well as carbons which have been covalently bonded to nitrogen functions.

TABLE 7

DISCHARGE PERFORMANCE OF LI/SO$_2$Cl$_2$ CELLS AT 15 mA/cm$^2$

| CARBON SAMPLE | CARBON FUNCTIONALITY | V @ 50% DOD | CAPACITY Ah/g (To 2.0 V Cut Off) |
|---|---|---|---|
| 1. Unoxidized SAB | Oxide | 2.75 | 1.65 |
| 2. Carbon, Example 1A | Oxide | 2.90 | 3.96 |
| 3. Carbon, Example 1B | Oxide | 2.80 | 2.52 |
| 4. Carbon, Example 1C | Oxide | 2.70 | 2.12 |
| 5. Carbon, Example 4A | Urea Treated- | 2.95 | 2.63 |
| 6. Carbon, Example 5A | Urea Treated-Reduced | 2.80 | 2.77 |
| 7. Carbon, Example 5C | Urea Treated-Reduced | 2.95 | 2.86 |
| 8. Carbon, Example 2A | Tertiary Amide | 3.03 | 3.85 |
| 9. Carbon, Example 3 | Tertiary Amide | 2.80 | 2.65 |
| 10. Carbon, Example 6A | Hydrazine Product | 2.80 | 4.39 |
| 11. Carbon, Example 6C | Phenylhydrazine Product | 2.75 | 3.38 |

EXAMPLE 15

Cylindrically Wound Lithium/SOCl$_2$ Batteries

Cylindrically wound AA cells of a sophisticated design were fabricated by Battery Engineering, Inc. Hyde Part, Mass., using unoxidized SAB carbon as a control, and a urea treated SAB (Example 4A) carbon sintered with Teflon binder at 150° C. These batteries were constructed with 0.57 g of carbon uniformly distributed on both sides of the nickel screen current collector, of dimensions 2.5 inch$\times$1.5 inch$\times$0.035 inch. The effective surface area was 19.05 cm$^2$. The anode consisted of 0.59g lithium metal embedded on a nickel current collector, of dimensions 7.60cm$\times$3.80 cm$\times$0.038 cm. The electrolyte was 6g of 1.8M LiAlCl$_4$ in SOCl$_2$. These cells were discharged at a rate of 5mA/cm$^2$. The control cell discharged a total of 42.0 minutes to 2.5V and 46.2 minutes to the 2.0V level. By comparison the cell containing urea treated SAB gave much improved performance, discharging a total of 79.2 minutes to 2.5V and 83.4 minutes to the 2.0V level.

EXAMPLE 16

Lithium/SO$_2$ Batteries

A primary and a secondary lithium/sulfur dioxide battery is prepared with electrodes utilizing a nitrogen functionalized carbon, namely Black Pearls 2000, which is reacted with hydrazine following the procedure of Example 6A.

EXAMPLE 17

Electrochemical Synthesis of Peroxide

Vulcan XC-72 is preoxidized and nitrogen functionalized with excess hydrazine (see Example 6). The washed and dried modified carbon is formed into a gas diffusion cathode using Teflon emulsion as a binder. This electrode is fitted into a cell containing aqueous electrolyte as catholyte, and oxygen is fed to the non-wetted side of the cathode. Passage of current results in the formation of hydrogen peroxide in the catholyte.

While the invention has been described in conjunction with specific examples thereof, this is illustrative only. Accordingly, many alternatives, modifications and variations will be apparent to persons skilled in the art in light of the foregoing description, and it is therefore intended to embrace all such alternatives and modification as to fall within the spirit and broad scope of the appended claims.

We claim:

1. An energy producing electrochemical cell having improved performance characteristics, which comprises at least a cathode, an anode and an electrolyte, said cathode comprising elemental carbon modified with nitrogen-containing groups, wherein at least one member selected from the group consisting of said cathode, anode, electrolyte and a fuel introduced into said cell is consumed during discharge to produce a useful energy output.

2. The energy producing electrochemical cell of claim 1 wherein said elemental carbon cathode is modified with nitrogen-containing groups sufficient to provide at least a 5 percent improvement in at least one performance characteristic over an equivalent energy producing electrochemical cell comprising unmodified elemental carbon.

3. The energy producing electrochemical cell of claim 1 wherein said elemental carbon is preoxidized prior to modification with nitrogen-containing groups.

4. The energy producing electrochemical cell of claim 2 wherein the elemental carbon, modified with nitrogen-containing groups, contains from about 0.001 to about 20% by weight of nitrogen.

5. The energy producing electrochemical cell of claim 2 wherein the nitrogen-containing groups of the modified elemental carbon cathodes are selected from the group consisting of amines, amides, imines, quaternary ammonium, hydrazines, hydrazides, ureides, thioureids, guanidines, heterocycles and mixtures thereof.

6. The energy producing electrochemical cell of claim 2 wherein the nitrogen-containing groups of the modified element carbon cathodes are selected from the group consisting of tertiary amines, tertiary amides, tertiary imines and mixtures thereof.

7. The energy producing electrochemical cell of claim 2 wherein the elemental carbon cathode is modified with a ureide.

8. The energy producing electrochemical cell of claim 2 wherein the elemental carbon cathode is modified with a thioureide.

9. The energy producing electrochemical cell of claim 2 wherein the elemental carbon cathode is modified with a hydrazine.

10. The energy producing electrochemical cell of claim 2 wherein the elemental carbon cathode is modified with a hydrazide.

11. The energy producing electrochemical cell of claim 2 wherein the elemental carbon cathode is modified with quaternary ammoniuim groups.

12. The energy producing electrochemical cell of claim 4 which is a high energy-density battery.

13. The high energy-density battery of claim 12 wherein the elemental carbon is preoxidized prior to modification with nitrogen-containing groups.

14. The high energy-density battery of claim 12 which is a primary battery having an electrolyte comprising a member selected from the group consisting of sulfur dioxide, thionyl chloride, sulfuryl chloride, phosphorus oxychloride, vanadium oxychloride and selenium oxychloride.

15. The high energy-density battery of claim 12 wherein the anode comprises a metal selected from the group consisting of lithium, calcium and alloys thereof; the cathode comprises elemental carbon modified with a nitrogen-containing group selected from the group consisting of an amine and an amide, and the electrolyte comprises a member selected from the group consisting of thionyl chloride, sulfuryl chloride and sulfur dioxide.

16. The high energy-density battery of claim 12 wherein the anode comprises a metal selected from the group consisting of lithium and a lithium metal alloy; the cathode comprises elemental carbon modified with nitrogen-containing groups selected from the group consisting of ureides, thioureides and mixtures thereof and the electrolyte comprises sulfuryl chloride.

17. The high energy-density battery of claim 16 wherein the elemental carbon is preoxidized prior to modification with nitrogen-containing groups.

18. The high energy-density battery of claim 12 which is a lithium-sulfur dioxide battery.

19. The high energy-density battery of claim 12 which is a lithium-sulfuryl chloride battery.

20. The high energy-density battery of claim 12 which is a lithium-thionyl chloride battery.

21. An energy producing electrochemical cell having improved performance characteristics, which comprises at least a cathode, an anode and an electrolyte, said cathode comprising an oxidized carbon having sufficient oxygen functionality added thereto to produce at lesat a 5 percent improvement in at least one performance characteristic over an equivalent cell having an unoxidized carbon cathode, wherein at least one member selected from the group consisting of said cathode, anode, electrolyte and a fuel introduced into said cell is consumed during discharge to produce a useful energy output.

22. The cell of claim 21 which is an alkaline battery.

23. The cell of claim 21 which is a high energy-density battery.

24. The cell of claim 23 wherein the anode of the high energy-density battery comprises a metal selected from the group consisting of lithium, calcium, and alloys thereof; the cathode comprises the oxidized carbon and the electrolyte comprises a conductive salt dissolved in a material selected from the group consisting of thionyl chloride, sulfuryl chloride and sulfur dioxide.

25. A chemically modified carbon which comprises nitrogen-containing groups bonded to elemental carbon said nitrogen-containing groups having the formula:

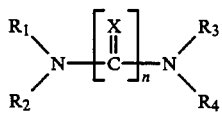

wherein n is 0 or 1; X is O, S or N—$R_5$, at least one of the substituents $R_1$-$R_5$ is a site of covalent bonding to said elemental carbon and the remaining R substituents are hydrogen, alkyl, alkoxy, aryl, aralkyl, hydroxy, quaternary ammonium, amino, amido, imino, acyl or nitro, or the remaining R substituents in groups selected from $R_1$ and $R_2$, $R_3$ and $R_4$, $R_1$ and $R_3$, $R_2$ and $R_4$, and $R_5$ with other R's together, namely $R_3$, $R_2$, $R_3$ or $R_4$ with their respective nitrogens forming a 4 to 7 membered heterocyclic ring.

26. The modified carbon of claim 25 wherein alkyl contains from 1 to 10 carbons, aryl and aralkyl are unsubstituted phenyl or phenyl substituted with alkyl, halo, haloalkyl, carboxy or carboxyester.

27. The modified carbon of claim 25 which is elemental carbon (Gr) with a nitrogen-containing group selected from:

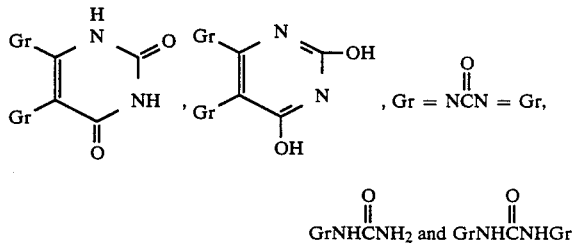

28. A chemically modified carbon prepared by reacting elemental carbon with a nitrogen-containing group selected from a member of the group consisting of urea, a substituted urea having at least one hydrogen and urea forming reagents.

29. The chemically modified carbon of claim 28 wherein the elemental carbon is reacted with urea.

30. The chemically modified carbon of claim 28 wherein the elemental carbon is heated in the presence of ammonium carbonate.

31. The chemically modified carbon of claim 28 wherein the elemental carbon is heated in the presence of ammonia and carbon dioxide.

32. The chemically modified carbon of claim 28 wherein the elemental carbon is heated in the presence of cyanamide and water.

33. An electrode for an energy consuming cell comprising the chemically modified carbon of claim 25.

34. An electrochemical cell comprising the carbon electrode of claim 33.

35. The cell of claim 21 wherein the oxidized carbon cathode is modified with nitrogen-containing groups.

36. The cell of claim 35 wherein the oxidized carbon cathode is modified with a nitrogen-containing group selected from the group consisting of a ureide and a thioureide.

* * * * *